US005468396A

United States Patent [19]
Allen et al.

[11] Patent Number: 5,468,396
[45] Date of Patent: Nov. 21, 1995

[54] CENTRIFUGAL CLEANING OF PULP AND PAPER PROCESS LIQUIDS

[75] Inventors: Lawrence H. Allen, Pointe Claire; Christine L. Lapointe, Dorion, both of Canada

[73] Assignee: Pulp and Paper Research Instutute of Canada, Pointe-Claire, Canada

[21] Appl. No.: 213,639

[22] Filed: Mar. 16, 1994

[51] Int. Cl.$^6$ .................................................. B01D 21/26
[52] U.S. Cl. .......................... 210/787; 210/806; 210/928; 210/360.1; 209/72 S; 494/43; 494/60; 494/80
[58] Field of Search ................................ 210/512.1, 787, 210/360.1, 512.3, 295, 806, 928; 209/72 S; 494/43, 60, 80

[56] References Cited

U.S. PATENT DOCUMENTS

| | | | |
|---|---|---|---|
| 5,131,544 | 7/1992 | Serres et al. | 210/512.1 |
| 5,244,575 | 9/1993 | Marshall | 210/787 |

OTHER PUBLICATIONS

Steven Levis, Latest Developments in Lightweight Contaminant Removal, 1991, pp. 1057–1062.
Mutton, D. B., "Wood Extractives and their Significance to the Pulp and Paper Industries." Ch. 10, Wood Resins, Ed. W. E. Hillis, Academic Press, New York (1962).
Back, E. Svensk Papperstidn. 63(22):793 (1960) "Resin in Conifer Pulpwood and Fundamentals of Pitch Control in Pulp and Paper Manufacture."
Back, E. Svensk Papperstidn, 72(4):109 (1969) "Vedanatomiska aspekter pa hartsproblem".
L. H. Allen, Pulp Paper Can. 76(5):70(1975) "Pitch in Wood Pulps".
G. M. Dorris, M. Douek and L. H. Allen, J. Pulp Paper Sci., 11(5): J149(1985) "Analysis of Amide Defoamers in Kraft Mill Pitch Deposits".
N. Dunlop–Jones and L. H. Allen, J. Pulp Paper Sci., 15(6):J235(1989) "the Influences of Washing, Defoamers and Dispersants on Pitch Deposition from Unbleached Kraft Pulps".
Wearing, J. T., Ouchi M. D., Mortimer R. D., Kovacs T. G. and Wong A. J., Pulp Paper Sci., 10(6):J178 (1984) "Factors Controlling Resin and Fatty Acid Dissolution in Sulphite Cooking of Black Spruce".
M. Douek and L. H. Allen, J. Pulp Paper Sci., 17(5):J171 (1991) Some Aspects of Pitch Control With Talc in Unbleached Kraft Pulps.
L. H. Allen and M. Douek, J. Pulp Paper Sci., 19(3):J131–J136 (1993) "Effectiveness of Talc for Pitch Control in Kraft Pulp Manufacture".
L. H. Allen (Tappi J., 71(1):61–64 (Jan. 1988)) "The Importance of pH in Controlling Metal–Soap Deposition".

*Primary Examiner*—Robert A. Dawson
*Assistant Examiner*—David Reifsnyder
*Attorney, Agent, or Firm*—Swabey Ogilvy Renault

[57] ABSTRACT

A process for the removal of dispersed contaminants less dense than water from pulp and paper mill process liquids, comprises passing the liquid through a centrifuge and collecting the contaminants as a less dense fraction. The application of this invention to paper industry process liquids provides a means of removing a significant fraction of the wood resin and wood resin soaps from the process stream, thus enabling (1) a greater extent of reuse of filtrates and, hence, less effluents from mills, and (2) fewer problems from wood resin, such as deposit formation, loss of strength of product, and contamination of product with dirt particles.

12 Claims, 3 Drawing Sheets

CENTRIFUGAL CLEANING OF PULP AND PAPER PROCESS LIQUIDS

BACKGROUND OF INVENTION

1. Field of Invention

The present invention relates to a process for removal of contaminants less dense than water from pulp and paper mill liquids, and, more especially, to a process for deresination of pulp and paper industry process liquids.

2. Description of Prior Art

A small fraction, (usually 1–5%) of the weight of wood from all species of trees consists of wood resin (Mutton, D. B., "Wood Extractives and Their Significance to the Pulp and Paper Industries". Ch10, Wood Resins, Ed. W. E. Hillis, Academic Press, New York, (1962)). Wood resin is usually defined as the material in wood which is insoluble in water, but soluble in organic solvents (Mutton, D. B., "Wood Extractives and Their Significance to the Pulp and Paper Industries". Ch. 10, Wood Resins, Ed. W. E. Hillis, Academic Press, New York, (1962)). Resin is present in wood mainly in two locations: the parenchyma cells and the resin canals (Back, E. Svensk Papperstidn. 63(22): 793 (1960); Back, E., Svensk Papperstidn., 72(4): 109 (1969)).

When wood is pulped, be it by a chemical process, a mechanical process, or a combination of the two, the wood resin remains in a number of physical locations (L. H. Allen, Pulp Paper Can., 76(5):70 (1975)): on the surfaces of fibers (in patches and droplets), inside parenchyma cells, on the surfaces of pulp fines, dissolved in the pulp white water (at pH values above 6), and dispersed in the pulp white water (L. H. Allen, Trans. Tech. Sect. CPPA, 3(2): 32 (1977)).

In a chemical pulp mill, wood chips are cooked in the presence of certain chemicals to dissolve the lignin between the fibers. At the end of this process the resulting pulp is washed to remove residual cooking liquor containing dissolved and dispersed lignin. In this process a certain amount of dissolved and dispersed resin is also removed. However, industrial washing is seldom complete and a substantial fraction of the wood resin which is dissolved and dispersed in the process liquid of the wet pulp usually remains and continues downstream. The pulp is subsequently bleached with various chemicals and at the end of each chemical treatment it is usually washed. Ideally, the wash water from each washer is discarded; nevertheless, because of environmental pressures to reduce effluents from mills, this is rarely done and the wash water is recirculated, so that it is reused in the washer of an earlier stage in the bleachery. Because several acidic and alkaline stages are usually found in the bleaching sequence, the recirculated water is usually of two types: acidic and alkaline. The rejected wash water from the first two stages (usually the chlorination and first extraction stages) of the bleachery is usually combined to give a total bleachery effluent. In recent years there has been intense pressure to reuse a substantial portion of the acidic and alkaline wash waters and this has resulted in a very substantial build-up of the dissolved and suspended wood resin in process liquids. The result of this is usually deposition of wood resin and other substances on the walls of the process equipment. The deposits can subsequently break away from surfaces and cause contamination of the product with pitch-dirt specks. The formation of deposits can be exacerbated by a number of factors in the operation of a kraft mill and these have been well documented (L. H. Allen, Pulp Paper Can., 89(10): T342 (1988)).

In mechanical pulp mills, the wood is converted into wood pulp by mechanical means, usually without chemicals. This results in a physical redistribution of the wood resin similar to that described previously for kraft pulps. Because mechanical pulps are rarely washed, the resin loading in this kind of pulp is often high and can cause deposition problems during subsequent paper manufacture. More intensive reuse of both mechanical pulp, mill and paper machine white waters causes a build-up in the concentration of water-borne resin (L. H. Allen and C. J. Maine, Pulp Paper Can., 79(4): T152 (1978)) and exacerbates the tendency for pitch deposition (L. H. Allen, Trans. Tech. Sect. CPPA, 3(2): 32 (1977)).

Many of the chemicals used to combat foam in pulp and paper mills end up dispersed in the aqueous phase of a pulp suspension. Unfortunately, these often tend to co-deposit with wood resin (G. M. Dorris, M. Douek, and L. H. Allen, J. Pulp Paper Sci., 11(5):J149 (1985); N. Dunlop-Jones and L. H. Allen, J. Pulp Paper Sci., 15(6): J235 (1989)).

It is also an accepted fact that the presence of high amounts of dissolved and dispersed resin in paper machine process liquids usually leads to reduced paper strength and runnability (Wearing, J. T., Ouchi, M. D. Mortimer, R. D., Kovacs, T. G., and Wong, A., J. Pulp Paper Sci., 10(6):J178 (1984)).

Prior procedures for reducing the concentrations of dissolved and dispersed resins in pulp and paper mill process liquids have consisted of one or more of the following approaches:

1. By constantly discarding a fraction of the process liquid, the dispersed resin is bled from the system. This practice is no longer tolerated to the degree that it has been in the past, for environmental reasons.

2. Washing of a wet pulp with water and discarding the wash water is an obvious way to reduce the water-borne resin concentration in a pulp (L. H. Allen and C. J. Maine, Pulp Paper Can., 79(4): T152 (1978)). Nowadays, a substantial fraction of this wash water must be reused, for environmental reasons.

3. The use of a Frotapulper (trade mark of MoDo), followed by a caustic extraction and subsequent treatment of the extraction filtrate by flotation has recently been described for the deresination of sulfite pulps. These treatments are relatively expensive and certainly do not remove all of the resin.

4. Flotation in a flotation save-all is another potential method of removing resin from process liquids. This is an expensive process under most circumstances.

5. The flocculation of dispersed resin with polymers, alum, and flocculants has been used in many paper mills to reduce the concentration of dispersed resin. The cost of the chemical additives for this kind of treatment is appreciable.

6. The addition of talc has been advocated as a way to remove dispersed resin. The resin particles adsorb on the surfaces of talc and are less apt to deposit (L. H. Allen, Trans. Tech. Sect. CPPA, 3(2):32 (1977)). It has, however, recently been demonstrated that only a small fraction of the water-borne resin adsorbs on talc, leaving the balance dispersed in the process liquid. Talc prevents deposition, by contrast, by a detackification mechanism (M. Douek and L. H. Allen, J. Pulp Paper Sci., 17(5): J171 (1991); L. H. Allen and M. Douek, J. Pulp Paper Sci. 19(3): J131–J136 (1993)). Hence, the addition of talc is not a particularly efficient way to remove resin from pulp and paper mill process liquids.

7. The use of dispersants is common for the removal of resin from kraft pulps in the alkaline stages of bleaching. This is a proven way of removing resin from the fibers; however, the resin passes into the dispersed phase, so that there is actually a buildup in the process liquid. Therefore, this is not a method for deresinating the process liquid.

SUMMARY OF THE INVENTION

The present invention provides a means to reduce the concentration of contaminants such as wood resin in pulp and paper process liquids.

An object of the invention is to remove the dispersed contaminants such as wood resin having a density less than water from pulp and/or paper mill process liquids by exploiting the fact that the contaminant is less dense than the aqueous medium in which it is suspended.

In accordance with the invention, there is provided a process for removal of a dispersed contaminant less dense than water, from pulp and paper mill process liquids comprising feeding an aqueous pulp and paper mill liquid containing said contaminant into a centrifuge having an axis of centrifugal rotation, said centrifuge being effective to separate a fraction less dense than water, from water, centrifuging said aqueous liquid about said axis to separate said aqueous liquid as an aqueous fraction and a less dense contaminant fraction, in said centrifuge, and, recovering said aqueous fraction as a first discrete fraction from said centrifuge, and said contaminant fraction as a second discrete fraction from said centrifuge.

DESCRIPTION OF PREFERRED EMBODIMENTS

In particular, when carrying out the process of the invention, the process liquid containing the dispersed contaminants, is fed on a continuous basis through an industrial centrifuge. The centrifugation process can be sped up if a centrifuge with an inclined disc stack is employed; however, this is not an essential part of the invention, and any centrifuge capable of removing dispersed oil from water can be used.

The contaminants to be removed by the process of the invention, and which have a density less than water, i.e. a density of less than 1 g/cc, are contaminants such as wood resin and wood resin soaps which have a density which generally is in the range of 0.9 to 0.95 g/cc. Furthermore, contaminants such as wood resins are very finely dispersed as particles typically having a diameter of 0.2 to 5 μm and an average diameter of 0.75 μm; such particles may vary from liquid to glassy solids and thus may be present as droplets.

It was surprising that the wood resin soaps could be effectively removed by the process of the invention at pH values greater than 6, since these are generally considered to be water-soluble, and as such would not be amenable to separation with the centrifuge; possibly the soaps form aggregates which can be centrifuged.

When the present invention is practiced, it will enable the reuse to a much greater degree of process liquids within pulp and/or paper mills, as it provides a means to reduce the buildup of dispersed wood resin materials. Such a buildup can give rise to pitch problems, loss of product strength, and the presence of dirt specks in the product. The invention will also enable mills with high concentrations of dispersed resin to reduce these concentrations and thus achieve superior control of pitch problems, such as: deposit formation, loss of product strength, self-sizing, production of off-grade pulp contaminated with dirt specks, etc.

During centrifugation, the process liquid separates about the axis of centrifugal rotation to separate the aqueous process liquid as an aqueous fraction and a less dense contaminant fraction, in which the less dense contaminant fraction migrates towards the axis of centrifugal rotation. The axis of centrifugal rotation is, more especially, a vertical axis and the contaminant fraction is removed in a vertical upward flow about said axis.

The aqueous fraction flows radially outwardly from the axis, so that the aqueous and contaminant fractions are removed as separate discrete fractions.

Contaminants in the process liquid which are denser than water form a dense contaminant fraction as a third discrete fraction, in the centrifuge; this third fraction is formed radially outwardly of the axis, and is removed as a third discrete fraction from the centrifuge bowl.

BRIEF DESCRIPTION OF THE DRAWINGS

Other objects, purposes and advantages of the invention will be apparent from consideration of the following description. A list of accompanying drawings follows, in which.

DESCRIPTION OF PREFERRED EMBODIMENTS WITH REFERENCE TO THE DRAWINGS

Figure 1:
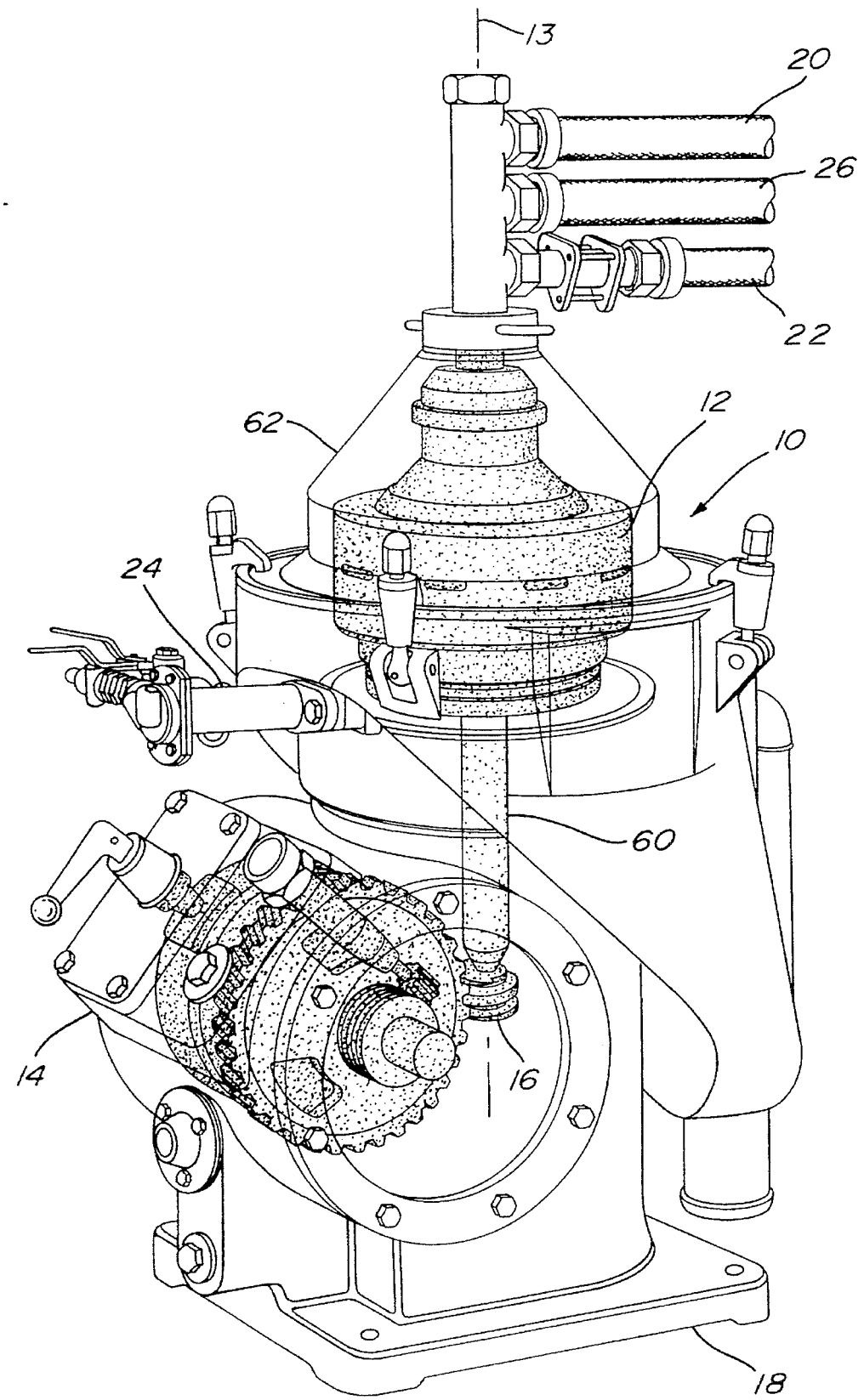
FIG. 1 is a schematic diagram of an industrial centrifuge, for use in the invention.

With further reference to FIG. 1, a centrifuge 10 has a centrifuge bowl 12, driven by an electric motor 14 through a transmission assembly 16, the hole being supported on a base 18. Centrifuge 10 has an axis 13 of centrifugal rotation.

The centrifuge 10 is of a known type, particularly designed for removing oil from water, and as such its structure is described in general terms only; centrifuges of this general type are available from Alfa-Laval, but any centrifuge design for removing oil from water and with a device for purging material denser than water can be employed in the invention.

Centrifuge 10 includes an inlet conduit 20 for process liquid to be treated, an outlet conduit 22 for purified process liquid, and high density discharge conduits 24, for discharge of high density contaminants, such as pulp fibers and fines, in the process liquid, and a low density discharge conduit 26 for discharge of low density contaminants in the processed liquid.

Figure 2:
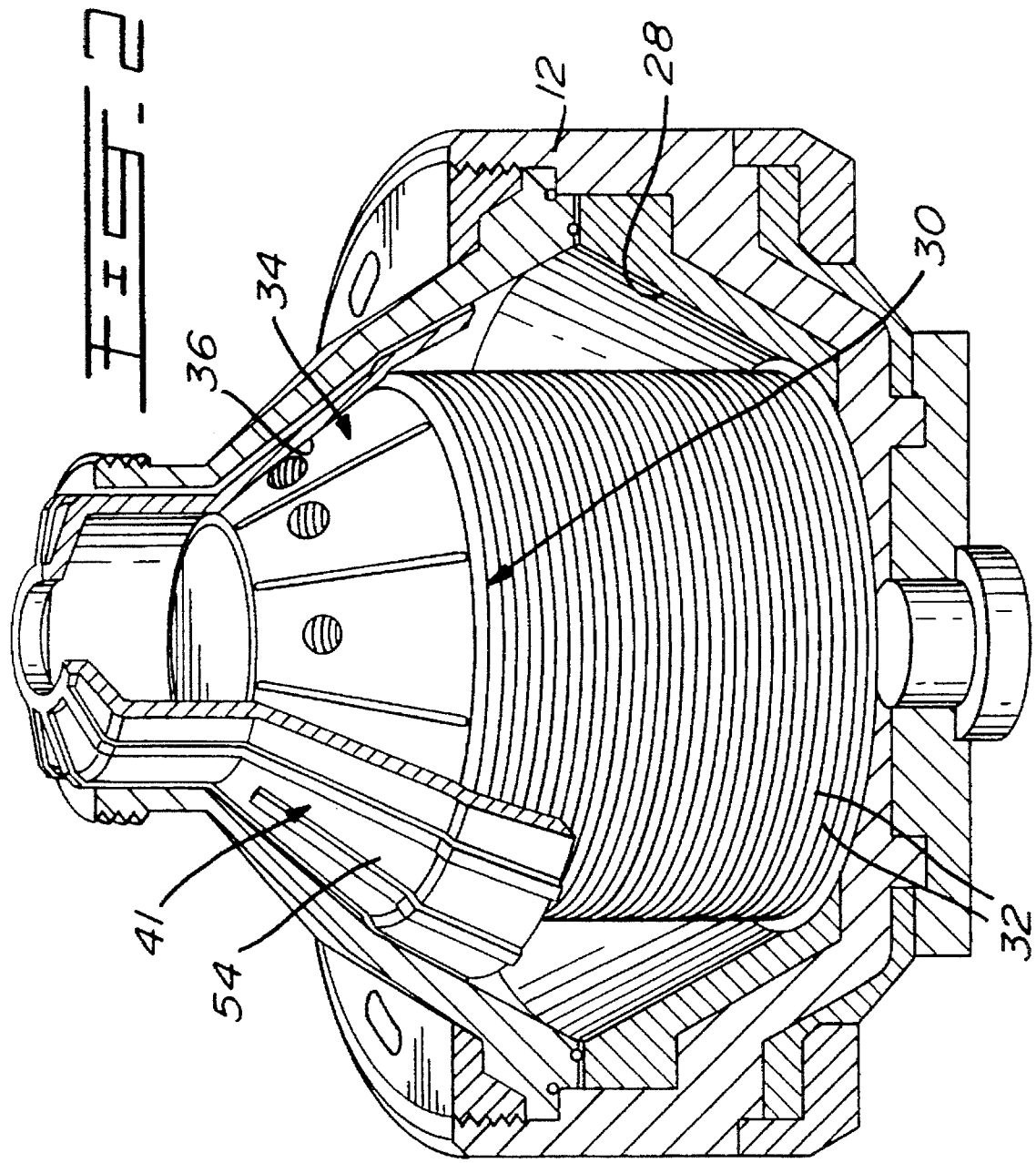
FIG. 2 is a schematic diagram of the centrifuge bowl and stack assembly, which divides the separation zone into layers.
Figure 3:
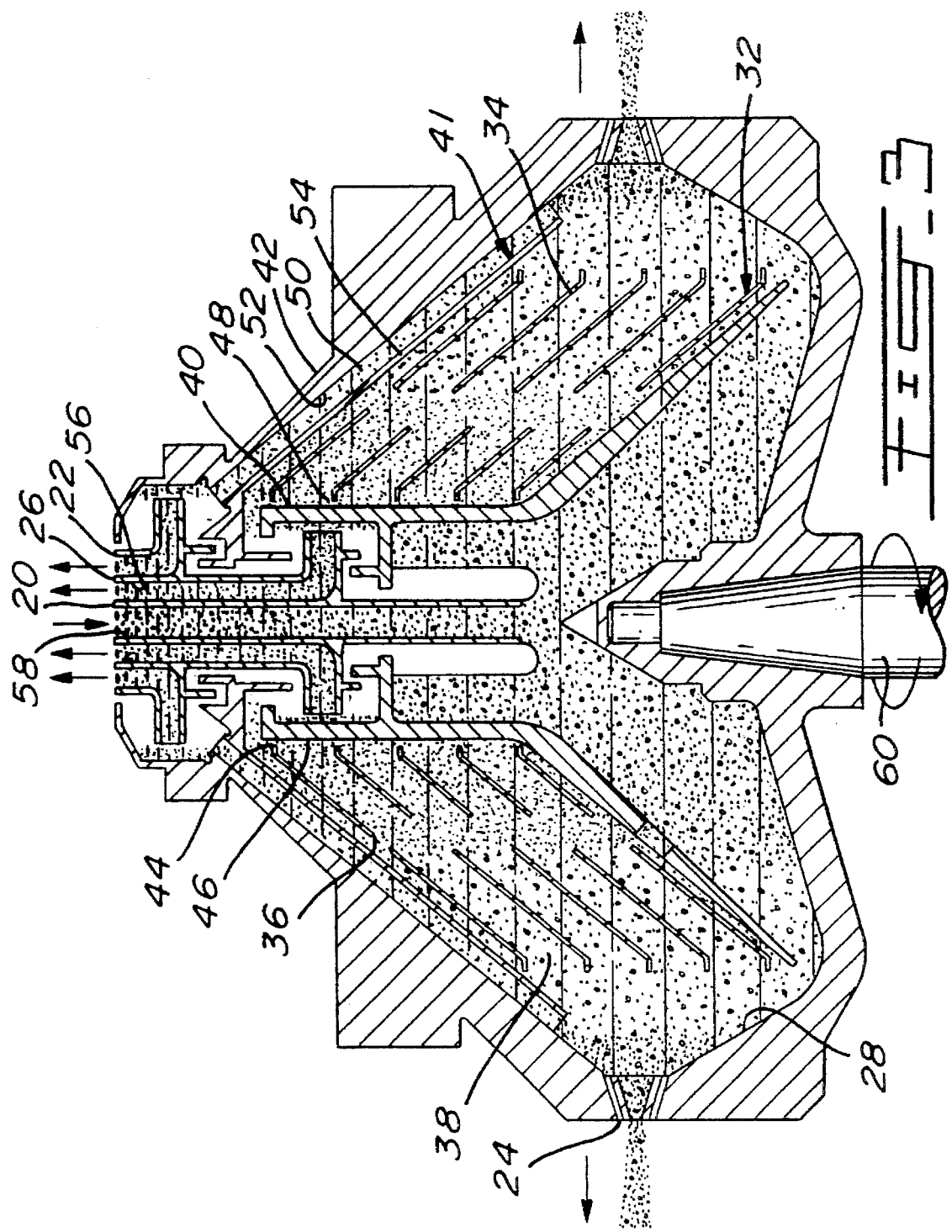
FIG. 3 is a schematic diagram showing the separation process in the centrifuge bowl.

With further reference to FIGS. 2 and 3, bowl 12 defines a separation chamber 28 which houses a stack assembly 30.

The stack assembly 30 comprises a plurality of separating members 32, in a spaced apart stacked arrangement, each separating member 32 has the general form of a hollow frusto-cone defining a flared skirt 34, each skirt having a plurality of orifices 36, and adjacent separating members 32 being spaced apart to define a plurality of frusto-conical separating passages 38.

In the art relating to the industrial centrifuges, the separating members 32 are often referred to as conical discs, with the stack assembly 30 being referred to as a disc stack.

Stack assembly 30 is disposed between an inner wall 40 having the form of an inverted funnel, and an outer wall 42, and includes an outer cover 41.

The skirt 34 of each separating member 32 terminates at an upper end in an inwardly directed lip 44, which is spaced from an outer face 46 of inner wall 40, a flow passage 48 being defined between the outer face 46 and the plurality of lips 44.

A flow passage 50 is defined between an inner face 52 of outer wall 42 and an outer face 54 of the cover 41.

The flow passage 48 communicates with an outflow passage 56 for the low density contaminants, which passage 56 communicates with discharge conduit 26.

The inlet conduit 20 communicates with an inflow passage 58 for process liquid.

The transmission assembly 16 includes a shaft 60 on which the centrifuge bowl 12 with stack assembly 30 is mounted for rotation.

Centrifuge 10 further includes a housing 62 which surrounds centrifuge bowl 12.

In operation, motor 14 drives shaft 60 through the transmission assembly 16 causing the centrifuge bowl 12 and stack assembly 30 to rotate at high speed relative to the stationary housing 62.

The plurality of separating members 32 provides a plurality of the thin frusto-conical passages 38, thereby dividing the separation zone in the separation chamber 28 into layers which greatly facilitate the separation of the low density contaminants from water, since they have to travel only a very short distance.

In operation, process liquid to be treated enters inflow passage 58 through inlet conduit 20. Within separation chamber 28 the process liquid is subjected to centrifugal force by the rotation of centrifugal bowl 12.

Under the centrifugal forces, contaminants which are denser than water find their way to the periphery of the centrifugal bowl 12 and are discharged intermittently through the discharge conduits 24.

Process liquid containing the low density contaminants enters the frusto-conical passages 38 of the stack assembly 30 via the orifices 36. The low density contaminants migrate because of their lower density inwardly towards the axis of the centrifuge whereas the higher density water migrates outwardly of the stack to the flow passage 50.

The process of separation of the low density contaminates from the water is further refined within the frusto-conical passages 38 of the stack assembly 30. During separation of low density contaminants and water, under centrifugal forces, within the frusto-conical passages 38, water falls through orifices 36 and flows outwardly of stack assembly 30 to the flow passage 50 at the periphery of the bowl 12, whereas the low density contaminants continue to migrate to the flow passage 48.

The low density contaminants flow from flow passage 48 into discharge conduit 26, and the purified liquid flows from flow passage 50 into outflow conduit 22.

Suitably, a set of filters (not shown) is provided upstream of inflow passage 58 to reduce the amount of suspended fibers and fines entering bowl 12; in this way the potential for clogging of the centrifuge 10 is reduced.

The higher density contaminants such as suspended fibers and fines which do enter bowl 12 in the process liquid are suitably discharged periodically through discharge conduits 24 which may suitably have valves which can be programmed to open automatically for short periods.

The process liquid, which may be treated entirely, or only in part, may consist of the filtrate from any of the washing stages in a kraft mill, or the brownstock decker. In a mechanical pulp mill, the filtrate from the mechanical pulp decker would be appropriate. The process of the invention may also be used to deresinate the plug screw feeder effluent. In a paper mill, the invention may be used on paper machine white water, or clarified white water. It also finds use in the deresination of press section effluent. In addition, in integrated pulp and paper mills, it may be appropriate to deresinate part or all of the mill effluent, to remove toxic wood resin and/or defoamer components.

The low density contaminants removed by the process of the invention are of much finer particle or droplet size than that of oil usually removed from water by centrifugation and it was surprising that the residence time and gravitational field in centrifuges employed for removal of relatively large diameter oil droplets in water would provide acceptable separation of the fine particles or droplets of low density contaminants such as wood resins and wood soaps in pulp mill process liquids. Furthermore, it might have been expected that the higher density contaminants such as pulp fibers and fines in the pulp mill process liquids would interfere with the efficient separation of the low density contaminants. The amount of high density contaminants can be significant even with use of pre-filtering, and comparable high density contaminants do not exist in the oil contaminated waters.

The pulp mill process liquids also contain minute pieces of cellulose and lignin embedded in the wood resin particles, and it might have been expected that these would interfere with an efficient separation.

In order to disclose more clearly the nature of the present invention, the following examples illustrating the invention are given.

EXAMPLES

Example 1

A laboratory scale, inclined disc centrifuge of the general type of the centrifuge 10 of FIGS. 1 to 3 with a rotational velocity of 9100 rpm, and a gravitational field of 10,000 g at periphery, was fed $E_1$ washer filtrate from the first extraction stage of a kraft mill bleach plant. Shown in Table 1 are the concentrations of dispersed resin, measured with a hemacytometer (L. H. Allen, Trans. Tech. Sect. CPPA, 3(2): 32 (1977)), before and after centrifugation. The fraction of resin removed is shown in the bottom row of Table 1. The fraction removed varied from 11.4 to 62.1%.

Example 2

The laboratory centrifuge used in Example 1 was fed with filtrate from the oxidative extraction stage of a kraft mill producing hardwood pulps. The data in Table 2 obtained with a hemacytometer show that the fraction of dispersed resin removed varied from 63.4 to 84.7%.

Measurements were also made of the soap concentration in the process liquid, before and after treatment. These measurements were done according to the procedure described by Allen (Tappi J.,71(1):61–64 (January 1988)). Shown in Table 3 are the percentages of original soap removed (right-hand column). It is evident that there was a substantial fraction (6.5 – 48.5%) of the soap removed.

Example 3.

Tall oil was dispersed with a blender into water, to give a concentration of 800 mg/L. Because tall oil is very similar in many of its properties to kraft mill wood resin, a dispersion of it in water approximates the wood resin found in the white water of a kraft mill. The tall oil dispersions were prepared at two different pH values (5 and 10.5) in separate experiments and the dispersions were centrifuged at pH 5. Shown in Table 4 are the concentrations of dispersed resin, as measured with a hemacytometer, before and after treatment with a laboratory, disc stack centrifuge. In the two experiments, pitch counts revealed that 40 and 53% of the tall oil initially present were removed.

Another way to measure the total tall oil in the water is by solvent extraction (L. H. Allen, Tappi J., 71(1):61–64 (January 1988)). By measuring the tall oil before and after centrifugation, in the two separate experiments, it was shown that 21 and 88% of the tall oil were removed.

Example 4

Tall oil was dispersed as in Example 3 into a sample of the first extraction stage filtrate from a kraft mill to give a concentration of 700 mg/L and a pH of 7.6. The pH was then adjusted to 5. The pitch count results, shown in Table 5 indicate a 35% removal of tall oil particles.

Example 5

The laboratory centrifuge used in Example 1 was fed with plug screw feeder pressate (after filtration through a 200 mesh screen) from a TMP mill. Table 6 shows the concentrations of dispersed resin before and after centrifugation, for seven samples. Samples 5 and 6 were centrifuged at 50° C.; all others were centrifuged at 20° C.

It is evident from Table 6 that an appreciable amount of the dispersed resin was removed from all samples by the centrifugation. The mean removal was 17% of the dispersed resin. Centrifugation at the higher temperature appears to lead to a higher resin removal.

Example 6

A commercial scale, inclined disc centrifuge (Alfa-Laval, Model WSPX-303) with a rotational velocity of 9,500 rpm, a gravitational field of $1.0 \times 10^4$ g at the periphery and a nominal flow rate capacity of 1,500 L/min was fed $E_o$ washer filtrate from the oxidative extraction stage of a kraft mill bleach plant. This type of centrifuge is designed to separate dispersed oil from water and also to purge materials which are denser than the aqueous phase, such as pulp fibers and fines, from the centrifuge bowl at preset intervals. The experiment was conducted on-site at the mill.

Table 7 shows typical data collected during the trial. The removals of dispersed resin (measured as in Example 1), total resin (measured as in Example 3) and soaps (measured as in Example 2) are shown in the table. The percentages of resin removed were: 33–71% for the dispersed resin, 0–17% for the total resin and 0–43% for the soaps.

During the course of the trial, the flow rates of $E_o$ filtrate through the centrifuge were varied in an attempt to determine how the separation would be affected. Generally, the lower the flow rate, the better the separation, however, there was considerable variability in the results.

For samples 1, 2 and 3 in Table 7, it was not possible to run the centrifuge for long periods of time because a coarse strainer basket ahead of the inlet pump of the centrifuge plugged with fibers and fines, and reduced the inlet flow rate, eventually to a trickle. For samples 7 and 8, a coarse "kidney" filter was inserted into the stream ahead of the centrifuge. This solved the problem of plugging of the strainer basket and permitted longer periods of operation. However, with the longer operating times, problems were encountered with accumulation of fibers between the discs of the disc stack. Even with frequent purgings (every 5 minutes) this accumulation built to a point where the spaces between the discs were solidly plugged, which prevented proper function of the centrifuge. To circumvent this, a set of prefilters was installed ahead of the centrifuge. For sample 11, two filters with screen mesh sizes 100 and 200 were used in sequence. For samples 12 and 13, three filters were employed in sequence with the following screen mesh sizes: 100, 150 and 200. In addition, the orifices in the lower-most disc were closed by spot-welding sheet metal over them. With these modifications, the centrifuge could be run for days (testing was for up to 3 days) without plugging, provided the solids were purged at least every 15 minutes (samples 12 and 13).

Results (Table 7) showed that the concentrations of resin were significantly lowered in the accepts stream. The relatively high concentrations of resin measured (after removal of fibers and fines) in the sludge (discharges from 24 in FIG. 3) strongly indicate that the resin phase is lost, during purging, with the sludge. As the purge flow volume is low, this would be an acceptable way to eliminate the resin from the recirculated process liquid in a mill.

Example 7

The same centrifuge as in Example 6 was employed in a trial at a bleached kraft pulp mill to separate the dispersed resin from weak black liquor. The results, in Table 8, show that (after pre-filtration, as in samples 12 and 13 of Table 7 in Example 6) 22–36% of the total resin in the weak black liquor and 18–39% of the soaps were removed. Because of the dark color and opaque nature of weak black liquor, it was not possible to measure concentrations of dispersed resin with a hemacytometer.

In general, and as indicated hereinbefore, the majority of the contaminants such as wood resins are dispersed as particles having a diameter of 0.2 to 5 μm and an average diameter of 0.75 μm, and typically 99% of the particles may have a diameter less than 5 μm, however, individual particles may be present of larger particle size, for example 2 mm, and one such particle might comprise more resin than the remaining small particles.

By means of the present invention, efficient removal of dispersed low density contaminants including wood resins and soaps, in pulp mill process liquids is achieved, whereas prior attempts employing centrifugal cleaners have not been successful.

TABLE 1

| | | Sample | | | | | | | |
|---|---|---|---|---|---|---|---|---|---|
| | | 1 | 2 | 3 | 4 | 5 | 6 | 7 | 8 |
| Dispersed Resin Concentration (millions of particles/mL) | Before Centrifugation | 3.5 | 4.0 | 3.5 | 4.0 | 3.3 | 3.5 | 2.9 | 3.1 |
| | After Centrifugation | 3.1 | 3.1 | 2.6 | 2.6 | 1.8 | 2.0 | 1.1 | 2.0 |
| Dispersed Resin Removal (%) | | 11.4 | 22.5 | 25.7 | 35.0 | 45.5 | 42.9 | 62.1 | 35.5 |

Mean Removal: 35.1 ± 15.6%

TABLE 2

| | | Sample | | | | | | | |
|---|---|---|---|---|---|---|---|---|---|
| | | 1 | 2 | 3 | 4 | 5 | 6 | 7 | 8 |
| Dispersed Resin Concentration (millions of particles/mL) | Before Centrifugation | 36.1 | 32.1 | 31.5 | 21.6 | 22.7 | 24.2 | 30.8 | 30.4 |
| | After Centrifugation | 9.7 | 10.3 | 6.6 | 7.9 | 5.9 | 3.7 | 8.1 | 8.1 |
| Dispersed Resin Removal (%) | | 73.1 | 67.9 | 79.0 | 63.4 | 74.0 | 84.7 | 73.7 | 73.4 |

Mean Removal: 73.6 ± 6.4%

TABLE 3

| Sample | Weight of Extract, Acidified (mg/L) | | Weight of Extract, Non-Acidified (mg/L) | | Weight of Soaps (mg/L) | Reduction (%) |
|---|---|---|---|---|---|---|
| 19-10:20 A IN | 56.8 | | 38.4 | | 18.4 | 6.5 |
| 19-10:20 B OUT | 45.6 | | 28.4 | | 17.2 | |
| 19-11:55 B IN | 68.0 | 69.0 | 32.5 | 36.5 | 34.0 | 5.9 |
| 19-11:55 A OUT | 53.5 | 56.1 | 22.5 | 23.0 | 32.0 | |
| 19-13:55 A IN | 60.0 | | 26.8 | | 33.2 | 22.9 |
| 19-13:55 B OUT | 51.6 | | 26.0 | | 25.6 | |
| 19-14:30 A IN | 58.8 | 53.5 | 28.8 | 30.0 | 26.8 | 23.1 |
| 19-14:30 B OUT | 50.0 | 45.5 | 24.4 | 30.0 | 20.6 | |
| 19-15:05 B IN | 69.2 | 61.0 | 33.2 | 27.5 | 34.8 | 21.8 |
| 19-15:05 A OUT | 56.0 | 41.5 | 25.2 | 18.0 | 27.2 | |
| 19-16:36 B IN | 63.2 | | 22.0 | | 41.2 | 48.5 |
| 19-16:36 A OUT | 48.0 | | 26.8 | | 21.2 | |

TABLE 4

| | | Pitch Count (millions of particles/mL) | Removal (%) | Total Resin (mg/L) | Removal (%) |
|---|---|---|---|---|---|
| Tall Oil (800 mg/L) in Water Mixed at pH = 10.5 and Adjusted to pH = 5 | Before Centrifugation | 738 | 40 | 747 | 21 |
| | After Centrifugation | 440 | | 592 | |
| Tall Oil (800 mg/L) in Water Dispersed at pH = 5 | Before Centrifugation | 112 | 53 | 653 | 88 |
| | After Centrifugation | 53 | | 80 | |

TABLE 5

| | | Pitch Count (millions of particles/mL) | Removal (%) |
|---|---|---|---|
| Tall Oil (700 mg/L) in E₁ Filtrate Dispersed at pH 7.6; centrifuged at pH 5 | Before Centrifugation | 11.9 | 35 |
| | After Centrifugation | 7.7 | |

TABLE 6

|  |  | Sample | | | | | | |
|---|---|---|---|---|---|---|---|---|
|  |  | 1 | 2 | 3 | 4 | 5 | 6 | 7 |
| Dispersed Resin Concentration (millions of particles/mL) | Before Centrifugation | 74.8 | 84.0 | 78.8 | 71.2 | 78.8 | 77.9 | 71.2 |
|  | After Centrifugation | 63.4 | 60.3 | 66.4 | 68.6 | 53.7 | 62.0 | 68.6 |
| Dispersed Resin Removal (%) | | 15.2 | 28.2 | 15.8 | 3.7 | 31.9 | 20.4 | 3.7 |

Mean Removal: 17.0 ± 10.9%
Pulp screw feeder pressate from TMP mill, filtered through 200 mesh.
Samples 1 to 4 & 7 were centrifuged at 20° C.
Samples 5 & 6 were centrifuged at 50° C.

TABLE 7

CENTRIFUGAL SEPARATION OF $E_o$ FILTRATE

| SAMPLES | | 1 | 2 | 3 | 7 | 8 | 11 | 12 | 13 |
|---|---|---|---|---|---|---|---|---|---|
| DISCHARGE INTERVAL (min) | | 10 | 10 | 5 | 5 | 5 | 15 | 15 | 15 |
| FILTRATE FLOW RATE (L/h) | | 500 | 400 | 720 | 380 | 381 | 754 | 760 | 520 |
| PITCH COUNT ($\times 10^6$ part./mL) | Before centrifugation | 22.9 | 13.6 | 26.2 | 10.6 | 9.2 | 8.1 | | 14.1 |
|  | After centrifugation | 15.4 | 5.7 | 17.6 | 3.1 | 4.0 | 3.8 | | 7.5 |
|  | Sludge | | | | 31.2 | 33.9 | | | |
| DISPERSED RESIN REMOVAL (%) | | 32.8 | 58.1 | 32.8 | 70.8 | 56.5 | 53.1 | | 46.8 |
| TOTAL RESIN (mg/L) | Before centrifugation | | 56.8 | | 46.4 | 43.6 | 22.5, 24.0 Mean: 23.3 ± 1.1 | 38.4 | 35.1 |
|  | After centrifugation | | 60.4 | | 44.0 | 36.0 | 21.5, 22.0 Mean: 21.8 ± 0.4 | 34.0 | 32.3 |
|  | Sludge | | | | | 60.8 | | 155.5 | 113 |
| TOTAL RESIN REMOVAL (%) | | | −6.3 | | 5.2 | 17.4 | 6.44 ± 5.15 | 11.5 | 8.0 |
| SOAPS (mg/L) | Before centrifugation | | 20.8 | | 23.2 | 17.6 | 6.75, 6.75 Mean: 6.75 ± 0.00 | 10.0, 11.2 Mean: 10.6 ± 0.8 | 19.5 |
|  | After centrifugation | | 28.4 | | 22.4 | 15.2 | 6.25, 7.75 Mean: 7.00 ± 1.06 | 4.4, 7.6 Mean: 6.0 ± 2.3 | 16.3 |
| SOAPS REMOVAL (%) | | | −36.5 | | 3.4 | 13.6 | −3.70 ± 15.71 | 43.4 ± 23.0 | 16.4 |

TABLE 8

CENTRIFUGAL SEPARATION OF WEAK BLACK LIQUOR

| SAMPLES | | 1 | 2 | 3 | 4 |
|---|---|---|---|---|---|
| DISCHARGE INTERVAL (min) | | 15 | 60 | 39 | 74 |
| LIQUOR FLOW RATE (L/h) | | 264 | 473 | 473 | 415 |
| TOTAL RESIN (mg/L) | Before centrifugation | 889 | 802 | 852, 830 Mean: 841 ± 16 | 1245 |
|  | After centrifugation | 675 | 627 | 646, 402, 578 Mean: 542 ± 125 | 976 |
| TOTAL RESIN REMOVAL (%) | | 24.1 | 21.8 | 35.6 ± 14.7 | 21.6 |
| SOAPS (mg/L) | Before centrifugation | 736 | 678 | 702, 738 Mean: 720 ± 25 | 812 |
|  | After centrifugation | 603 | 554 | 566, 320 Mean: 443 ± 173 | 617 |
| SOAPS REMOVAL (%) | | 18.1 | 18.3 | 38.5 ± 24.3 | 24.0 |

We claim:

1. A process for removal of a dispersed contaminant less dense than water, from pulp and paper mill process liquids, said contaminant being selected from the group consisting of dispersed wood resins and wood resin soaps, comprising:

feeding an aqueous pulp and paper mill liquid containing said contaminant through an inlet into a centrifuge having an axis of centrifugal rotation, said centrifuge being effective to separate a fraction less dense than water, from water, centrifuging said aqueous liquid about said axis to separate said aqueous liquid as an aqueous fraction which flows radially outwardly of said axis during the centrifuging and a less dense contaminant fraction which migrates towards said axis during the centrifuging and forms said contaminant fraction about said axis, in said centrifuge, and recovering said aqueous fraction at a first outlet, as a first discrete fraction from said centrifuge, and said contaminant fraction at a second outlet, as a second discrete fraction from said centrifuge.

2. A process according to claim 1, wherein said axis is a vertical axis and said second discrete fraction is removed through said second outlet in a vertical upward flow about said axis.

3. A process according to claim 2, wherein said liquid further contains a second contaminant more dense than water and said centrifuging forms a dense contaminant fraction as a third discrete fraction, in said centrifuge, radially outwardly of said axis, and recovering said third discrete fraction from said centrifuge at a third outlet.

4. A process according to claim 3, wherein said inlet communicates with a flow passage extending centrally of said centrifuge, about and along said axis, into an inflow zone about said axis, said feeding of said aqueous liquid being along said axis and within said flow passage into said inflow zone and thence outwardly of said inflow zone into a separation zone surrounding and separated from said flow passage and said inflow zone, the migration of the less dense contaminant fraction towards said axis being within said separation zone, and the flow of said aqueous fraction radially outwardly of said axis being within said separation zone.

5. A process according to claim 4, wherein said first and second outlets are concentric with said inlet; and said third outlet is radially outward of said separation zone and said inflow zone.

6. A process according to claim 5, wherein said separation zone is separated from said inflow zone and said flow passage by an inner wall, said inner wall extending outwardly from said inlet, and a flow port defined between an outer end of said inner wall, remote from said inlet, and an outer wall of said centrifuge, said aqueous liquid flowing from said inflow zone through said port to said separation zone.

7. A process according to claim 6, wherein said separation zone is defined between said inner wall and a cover wall adjacent to and spaced from said outer wall, said separation zone comprising a stacked plurality of spaced apart, parallel, separating members disposed between said inner wall and said cover wall, and a plurality of frusto-conical separating passages, the separating passages being defined between adjacent spaced apart separating members and between the outermost separating members and the adjacent inner wall and cover wall, respectively, said separating members each having an inner lip spaced apart from said inner wall, a first outflow passage, for said aqueous fraction, between said cover wall and said outer wall, said first outflow passage being in flow communication with said first outlet, a second outflow passage, for said less dense contaminant fraction, between the inner lips and said inner wall, said second outflow passage being in flow communication with said second outlet, the migration of the aqueous fraction being inwardly along said separating passages to said second outflow passage, and the flow of said aqueous fraction outwardly of said axis being from said separating passages to said first outflow passage.

8. A process according to claim 7, wherein said inner wall has a tubular inner portion merging with a frusto-conical portion, and each separating member comprises a hollow frusto-cone having a flared skirt, each skirt having a plurality of orifices, said aqueous liquid entering adjacent separating passages through said orifices.

9. A process according to claim 8, wherein said contaminant comprises particles having a diameter in the range of 0.2 to 5 μm.

10. A process according to claim 9, wherein said centrifuging is at a rotational velocity of the order of 9100 to 9500 rpm with a gravitational field of about 10,000 g at said outer wall.

11. A process according to claim 1, wherein said contaminant comprises particles having a diameter in the range of 0.2 to 5 μm.

12. A process according to claim 1 including a step of filtering said liquid to reduce the content of suspended fibers and fines, prior to feeding said liquid into said centrifuge.

* * * * *